United States Patent
Anderson et al.

(10) Patent No.: US 6,840,526 B2
(45) Date of Patent: Jan. 11, 2005

(54) BUMPER STEP

(75) Inventors: Michael D. Anderson, San Diego, CA (US); Stephen D. Ball, San Diego, CA (US)

(73) Assignee: Nissan Design America, Inc., San Diego, CA (US)

( * ) Notice: Subject to any disclaimer, the term of this patent is extended or adjusted under 35 U.S.C. 154(b) by 68 days.

(21) Appl. No.: 10/211,240

(22) Filed: Aug. 5, 2002

(65) Prior Publication Data

US 2003/0038446 A1 Feb. 27, 2003

Related U.S. Application Data

(60) Provisional application No. 60/309,872, filed on Aug. 6, 2001.

(51) Int. Cl.$^7$ .............................................. B60R 3/02
(52) U.S. Cl. ........................................ 280/166; 182/127
(58) Field of Search ........................... 280/163, 164.1, 280/166; 182/91, 127; 296/62

(56) References Cited

U.S. PATENT DOCUMENTS

| | | | |
|---|---|---|---|
| 1,479,644 A | | 1/1924 | Browne |
| 1,630,293 A | | 5/1927 | Fish |
| 1,834,825 A | * | 12/1931 | Bryant .................... 280/164.1 |
| 1,877,152 A | * | 9/1932 | Vogel ........................ 280/166 |
| 2,158,949 A | | 5/1939 | Sarles et al. |
| 2,653,036 A | * | 9/1953 | Creel et al. .................... 182/91 |
| 2,678,832 A | * | 5/1954 | Wright ........................ 182/89 |
| 3,794,345 A | | 2/1974 | Locke |
| 3,961,809 A | | 6/1976 | Clugston |
| 3,986,503 A | * | 10/1976 | Le Guillon .................. 182/89 |
| 4,021,071 A | | 5/1977 | Norman |
| 4,057,125 A | | 11/1977 | Kroft |
| 4,079,815 A | * | 3/1978 | Cormier ...................... 182/195 |
| 4,159,122 A | | 6/1979 | Stevens |
| 4,161,997 A | | 7/1979 | Norman |
| 4,191,388 A | | 3/1980 | Barksdale |
| 4,194,754 A | | 3/1980 | Hightower |
| 4,205,862 A | * | 6/1980 | Tarvin ........................ 280/166 |
| 4,274,648 A | | 6/1981 | Robins |
| 4,312,515 A | * | 1/1982 | Allori ........................ 280/166 |
| 4,405,141 A | | 9/1983 | Jurek |
| 4,462,486 A | | 7/1984 | Dignan |
| 4,605,098 A | | 8/1986 | Leuty |
| 4,620,609 A | | 11/1986 | Elsten |
| 4,750,752 A | | 6/1988 | Furuta |
| 4,750,753 A | | 6/1988 | Dezern |
| 4,753,447 A | | 6/1988 | Hall |
| 4,785,910 A | | 11/1988 | Tonkovich |
| 4,825,975 A | | 5/1989 | Symes |
| 4,856,810 A | | 8/1989 | Smith |
| 4,911,264 A | | 3/1990 | McCafferty |
| 4,930,797 A | | 6/1990 | Parrill |

(List continued on next page.)

FOREIGN PATENT DOCUMENTS

| | | | | |
|---|---|---|---|---|
| AU | 5531 | * | 11/1927 | .............. 280/164.1 |
| GB | 223378 | * | 10/1924 | .............. 280/164.1 |
| GB | 300482 | * | 11/1928 | ................ 280/166 |
| JP | 7-108958 | | 4/1995 | |
| JP | 7-30434 Y2 | | 7/1995 | |
| JP | 2597374 Y2 | | 4/1999 | |
| SU | 563313 | * | 7/1977 | ................ 280/166 |

Primary Examiner—Frank Vanaman
(74) Attorney, Agent, or Firm—Foley & Lardner LLP (57) ABSTRACT

A step assembly is provided having a step frame mounted for movement relative to a mounting surface between a deployed position and a stored position (or between a stored position and a deployed position), and at least one boss, the boss having a notch for holding the step frame in the deployed position. The step frame preferably has at least two legs oriented parallel to each other, and horizontally spaced from one another, each of the legs defining an upper end and a lower end, an axle connected at the upper end of the at least two legs, and a step member connected between the at least two legs proximate to the lower ends thereof.

20 Claims, 5 Drawing Sheets

U.S. PATENT DOCUMENTS

| | | |
|---|---|---|
| 5,005,850 A | 4/1991 | Baughman |
| 5,007,654 A | 4/1991 | Sauber |
| 5,039,119 A | 8/1991 | Baughman |
| 5,139,295 A | 8/1992 | Escobedo |
| 5,205,603 A | 4/1993 | Burdette, Jr. |
| 5,335,752 A | 8/1994 | Kozlowski |
| 5,358,268 A | 10/1994 | Hawkins |
| 5,456,479 A | 10/1995 | Conger |
| 5,513,866 A | 5/1996 | Sisson |
| 5,538,265 A | 7/1996 | Chen et al. |
| 5,549,312 A | 8/1996 | Garvert |
| 5,617,930 A * | 4/1997 | Elia ........................... 182/97 |
| 5,716,064 A | 2/1998 | Frerichs |
| 5,732,996 A | 3/1998 | Graffy et al. |
| 5,738,362 A | 4/1998 | Ludwick |
| 5,803,475 A | 9/1998 | Dick |
| 5,806,869 A | 9/1998 | Richards |
| 5,820,193 A | 10/1998 | Straffon |
| 5,842,709 A | 12/1998 | Maccabee |
| 5,897,125 A | 4/1999 | Bundy |
| 5,927,433 A | 7/1999 | Jaramillo, Sr. |
| 6,036,208 A | 3/2000 | Frerichs |
| 6,116,378 A | 9/2000 | Barrow |
| 6,168,176 B1 | 1/2001 | Mueller |
| 6,170,842 B1 | 1/2001 | Mueller |
| 6,471,002 B1 * | 10/2002 | Weinerman ................... 182/91 |

\* cited by examiner

BUMPER STEP

CROSS REFERENCE TO RELATED APPLICATION

This application claims the benefit of and priority to U.S. Provisional Patent Application No. 60/309,872, filed Aug. 6, 2001, which is incorporated by reference herein in its entirety.

BACKGROUND OF THE INVENTION

A. Field of the Invention

The invention relates generally to a step assembly, and more particularly to a vehicle step assembly, such as for a pickup truck, a sport utility vehicle (SUV), a non-commercial vehicle, an all terrain vehicle (ATV) or other land vehicle for example.

B. Background of the Invention

Presently, one step assembly is described in U.S. Pat. No. 5,732,996 (the "'996 patent"). The '996 patent discloses a tailgate step with a hinge assembly and a step assembly attached to the inside panel of the tailgate near its upper edge. The step assembly in the '996 patent freely rotates about a hinge pivot rod, which is positioned proximate and parallel to the upper edge of the tailgate. The step frame rests in a deployed position by contact with the tailgate due to the positioning of the hinge pivot rod.

The '996 patent suffers from many problems characteristic of existing step assemblies. In one aspect, the '996 step assembly must be mounted on a vehicle tailgate, which typically is not designed to support substantial loading. In a related aspect, the '996 step assembly must be mounted on the tailgate facing rearward. Thus, the '996 step assembly is not designed to be mounted facing a side of the vehicle (for example, a passenger side to facilitate bed access from the passenger side). Further, the '996 step assembly is designed to be mounted on a vehicle with a tailgate, thus it is not useful for mounting on a cargo van or delivery truck which may not have a tailgate surface for mounting the step assembly. In a related aspect, mounting the '996 step assembly on the tailgate may not be aesthetically pleasing, as the step assembly is visible even in a stored position. In another aspect, the '996 step assembly freely rotates about a hinge pivot rod, and does not provide a lockable stepping platform for the user, because the freely rotating hinge does not provide a secure locking member.

A second step assembly is described in U.S. Pat. No. 6,170,842 (the "'842 patent"). The '842 patent discloses a step assembly attached to the outer face of a vehicle bumper. The step assembly comprises a swinging step frame, which may be swung from a stored position to a deployed position. Unlike the '996 step assembly, the swinging step frame is locked in a position by a lock device which is automatically operative under the influence of gravity for locking the step in both positions, thereby providing a lockable stepping platform for the user.

The '842 patent, however, also suffers from many problems characteristic of existing step assemblies. As aforementioned with the '996 patent, the '842 patent is also mounted on a rearward facing surface, and is not designed to be mounted on a side of the vehicle. In another aspect, the '842 patent requires a substantially flat vertical surface for mounting the step assembly, which is not present on many bumper designs of existing vehicles. Further, the '842 step assembly may also not be aesthetically pleasing as it is also visible in the stored position.

SUMMARY OF THE INVENTION

The present invention is directed to overcoming or at least reducing the effects of one or more of the problems set forth above, as well as other problems found in the prior art.

According to one aspect of the present invention, a step assembly is provided comprising a step frame mounted for movement relative to a mounting surface between a deployed position and a stored position, and at least one boss, the boss comprising a notch for holding the step frame in the deployed position. The step frame preferably comprises at least two legs oriented parallel to each other, and horizontally spaced from one another, each of the legs defining an upper end and a lower end, an axle connected at the upper end of the at least two legs, and a step member connected between the at least two legs proximate to the lower ends thereof.

According to another aspect of the present invention, a step assembly is provided comprising a frame mounted for movement relative to a mounting surface between a deployed position and a stored position, a first notch for holding the frame in a position, and a spring for holding the frame in the notch. The frame preferably comprises a leg having an upper end and a lower end, and an axle connected at the upper end of the leg.

According to another aspect of the present invention, a vehicle loading device is provided comprising means for mounting a step member on a vehicle, means for selectably moving the step member between at least one deployed position and a stored position, and means for selectably retaining the step member in the deployed position.

BRIEF DESCRIPTION OF THE DRAWINGS

Advantages and features of the invention will become apparent upon reference to the following detailed description and the accompanying drawings, of which.

DETAILED DESCRIPTION OF SPECIFIC EMBODIMENTS

Reference will now be made in detail to presently preferred embodiments of the invention. Wherever possible, the same reference numbers will be used throughout the drawings to refer to the same or like parts.

The present invention relates generally to a step assembly, and more particularly to a vehicle bumper step assembly.

Figure 1:
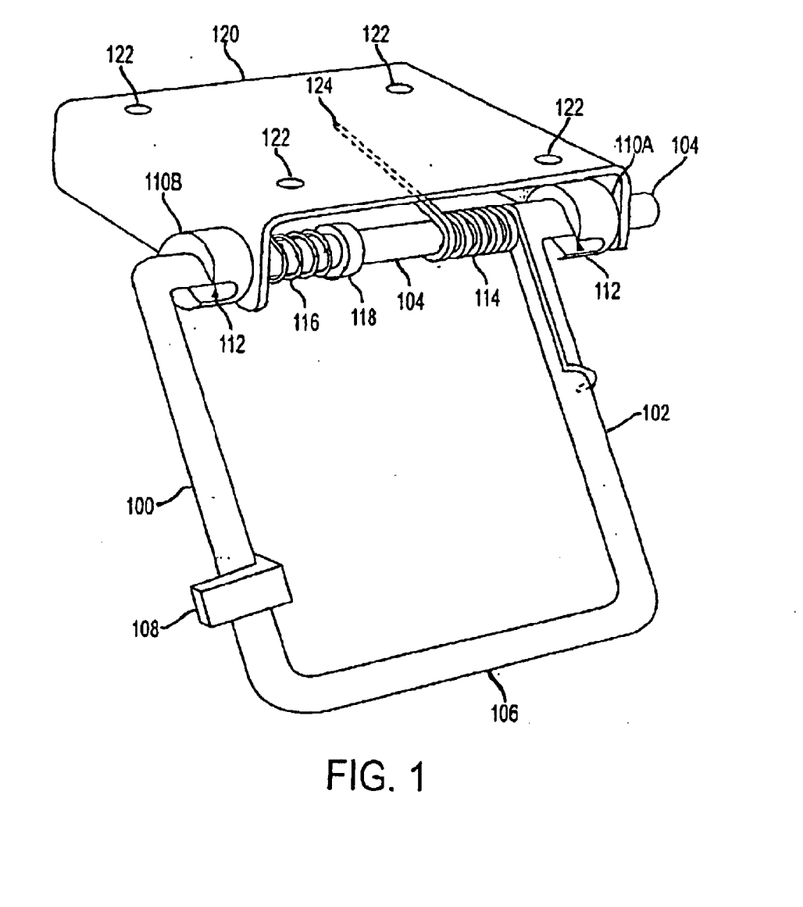
FIG. 1 shows an assembled embodiment of a step assembly according to an embodiment of the present invention.

In a first embodiment as shown in FIG. 1, a step assembly is shown in a schematic view (preferably for a passenger side of a vehicle). A step frame is shown comprising a first leg 100 and a second leg 102 oriented parallel to, and horizontally spaced from, one another. An axle 104 is shown connected at an upper end of legs 100 and 102. Step member 106 is shown connected between legs 100 and 102 at a lower end of legs 100 and 102. Optional operating tab 108 is shown connected to leg 100 for moving the step frame between a stored position and a deployed position. Optional operating tab 108 may also be connected to leg 102, or step member 106.

Alternatively, the step frame may comprise one or more legs in a substantially "L" shape, a "U" shape, a "∇" shape, a "Δ" shape, a trapezoidal shape, a ramp frame, or other configurations as would be readily apparent to one skilled in the art after reading this disclosure. Hence, a telescoping or multiple sectioned ramp such as a loading ramp, is also within the spirit and scope of the invention.

Boss 110A and boss 110B are shown comprising a notch 112 for holding the step frame in a deployed position. Optionally, boss 110A and boss 110B may be omitted, wherein mounting bracket 120 may comprise notches 112 for holding the step frame in one of a number of deployed positions. Further, one boss 110A or 110B may be used, however, a preferred embodiment comprises boss 110A and boss 110B. Alternatively, boss 110A and boss 110B may comprise multiple notches 112 for holding the step frame in one of a number of deployed positions, and/or may comprise a notch for holding the step frame in a stored position.

A first spring 114 operating on the step frame is shown, wherein the first spring 114 applies a force (in a rotational direction around axle 104) for moving the step frame from a deployed position to a stored position (or alternatively from a stored position to a deployed position). A second spring 116 (e.g., a pre-compressed spring) may be utilized to apply a force (along the longitudinal axis of axle 104) on the step frame for holding the step frame in a deployed position by keeping legs 100 and 102 in notches 112. Optional stop ring 118 may be utilized to prevent first spring 114 or second spring 116 from sliding relative to axle 104. Mounting bracket 120 is shown with optional mounting holes 122 to facilitate mounting to a vehicle (not shown). Optionally, mounting bracket 120 may comprise a notch 124 to receive first spring 114 or second spring 116, and/or a rubber bumper (not shown) for preventing contact between the step frame and the mounting bracket 120. Notch 124 may include a hole formed through the mounting bracket 120 to clip the first spring 114 into place.

Deploying a step assembly as described in this first embodiment may involve a number of steps. The step assembly is held in a stored position by first spring 114 when the step assembly is not being used. To deploy the step assembly, a user first rotates the step assembly from a stored position to a deployed position by applying a rotational force to operating tab 108 or directly to the step frame. When the step frame reaches the deployed position, second spring 116 applies an axial force on the step frame which pushes the step frame into notches 112 of boss 110A and boss 110B. Second spring 116 further retains the step frame in notches 112 while the step assembly remains in a deployed position.

Storing a step assembly as described in this first embodiment may also involve a number of steps. The step assembly is held in a deployed position by second spring 116 when the step assembly is being used. To store a deployed step assembly, a user first applies an axial force counter to the force applied by second spring 116, to disengage the step frame from notches 112 of boss 110A and boss 110B. First spring 114 then applies a rotational force on the step frame to move the disengaged step frame to a stored position.

In this first embodiment, axle 104, boss 110A, and boss 110B are shown engaging mounting bracket 120. Other configurations may be utilized as would be readily apparent to one skilled in the art after receiving the teachings herein. Optionally, mounting bracket 120 may incorporate a rotating section (not shown) to facilitate rotating the mounting bracket from a first position (for example, the step facing rearward) to a second position (for example, the step facing outboard). The rotating section may, for example, comprise a circular groove with roller bearings between the mounting bracket and a mounting surface, to facilitate rotating the mounting bracket.

Utilizing a notched boss configuration, the step frame is secured in a deployed position, thereby providing a stable platform for a user. Further, the step assembly may be configured such that under certain conditions jarring or bouncing of the step frame may disengage the step frame from the notches, as may occur if the step frame is deployed and the vehicle is driven over a rough terrain. Depending on the strength of first spring 114, the step frame may be automatically retracted under certain conditions when the step frame becomes disengaged from the notched boss.

Figure 2:
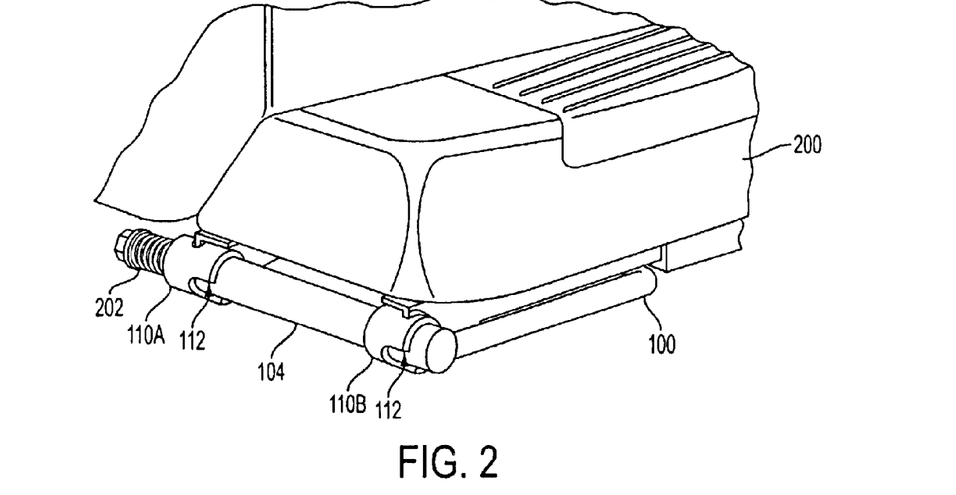
FIG. 2 shows a step assembly in a stored position mounted on a vehicle bumper according to an embodiment of the present invention.
Figure 3:
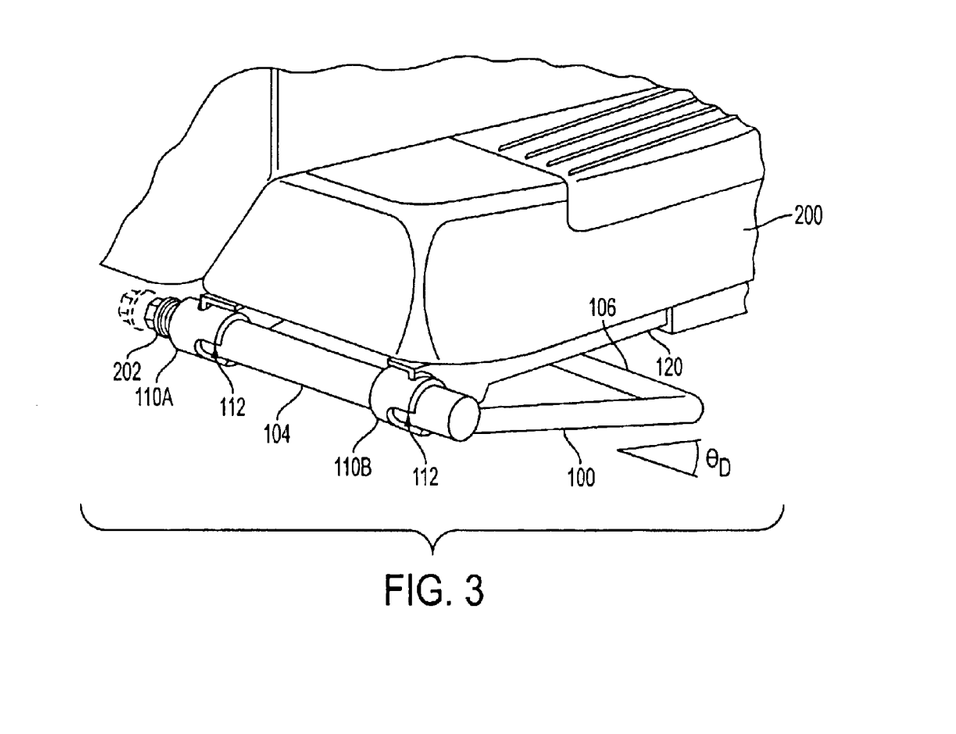
FIG. 3 shows a step assembly mounted on a vehicle bumper, and partially deployed, according to an embodiment of the present invention.
Figure 4:
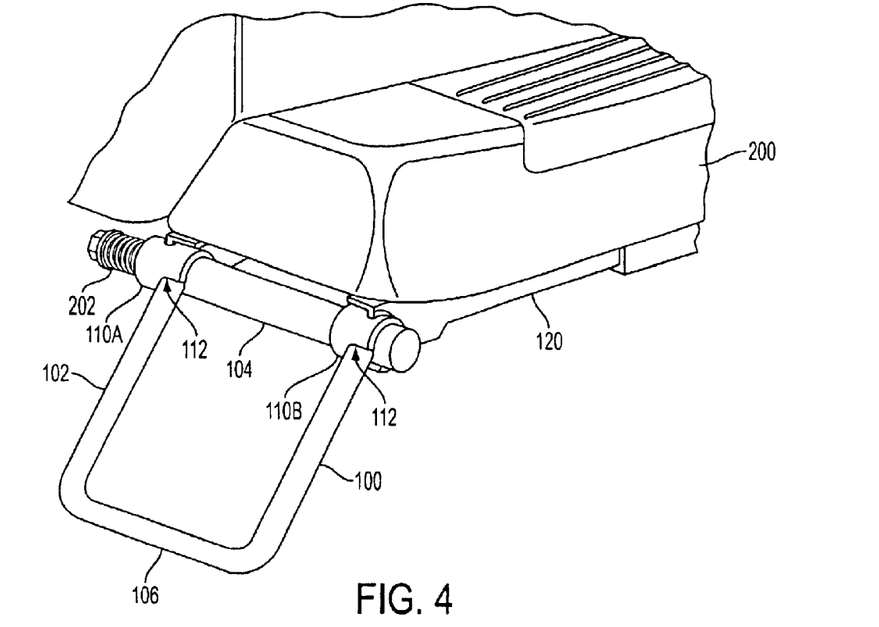
FIG. 4 shows a step assembly in a deployed position mounted on a vehicle bumper according to an embodiment of the present invention.
Figure 5:
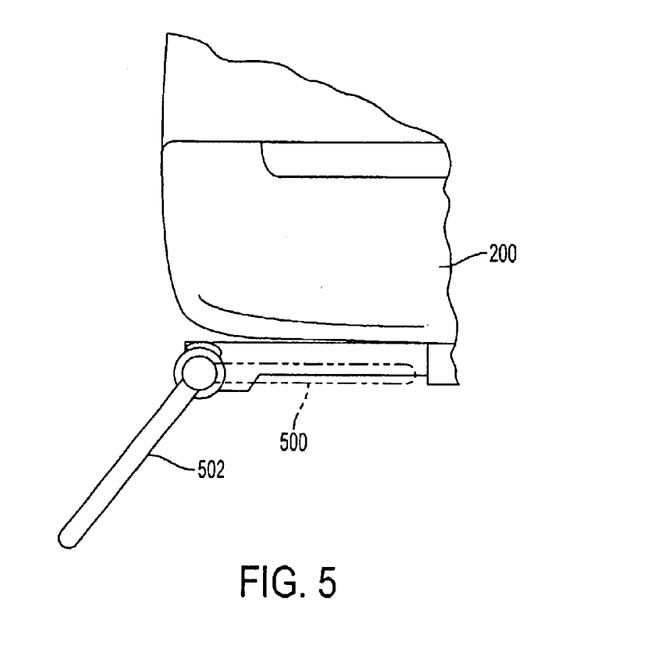
FIG. 5 shows a side view of a step assembly mounted on a vehicle bumper according to an embodiment of the present invention.

In a second embodiment as shown in FIGS. 2–5, a step assembly according to the present invention is shown mounted to a vehicle bumper 200 (preferably for a driver side of a vehicle). Alternatively, the step assembly may be mounted directly on a frame member of a vehicle. Mounting the step assembly on a vehicle bumper or frame member facilitates deployment of the step assembly independent of a tailgate position. Further, the step assembly is typically mounted on a vehicle bumper or frame member because they are generally designed to withstand heavier loads than a tailgate. FIG. 2 shows the step assembly in a stored position. FIG. 3 shows the step assembly moving between a stored position and a deployed position. FIG. 4 shows the step assembly in a deployed position. FIG. 5 shows a stored position 500 and a deployed position 502.

In the second embodiment as shown in FIG. 4, the step assembly may comprise a spring 202 to retain the step frame in the notches 112 of boss 110A and boss 110B and/or also to provide rotational force to return the step frame to the stored position when the step frame is removed from the notches 112. Preferably, additional notches (see FIG. 5) are provided to retain the step frame when in the stored position (see FIG. 2), such that the spring 202 also retains the step from in the additional notches of boss 110A and boss 110B. Thus, the spring 202 is not substantially compressed when the step from is in the stored position (see FIG. 2) or the deployed position (see FIG. 4), but is at least partially compressed when the step frame is between the stored position and the deployed position (see FIG. 3).

Figure 6:
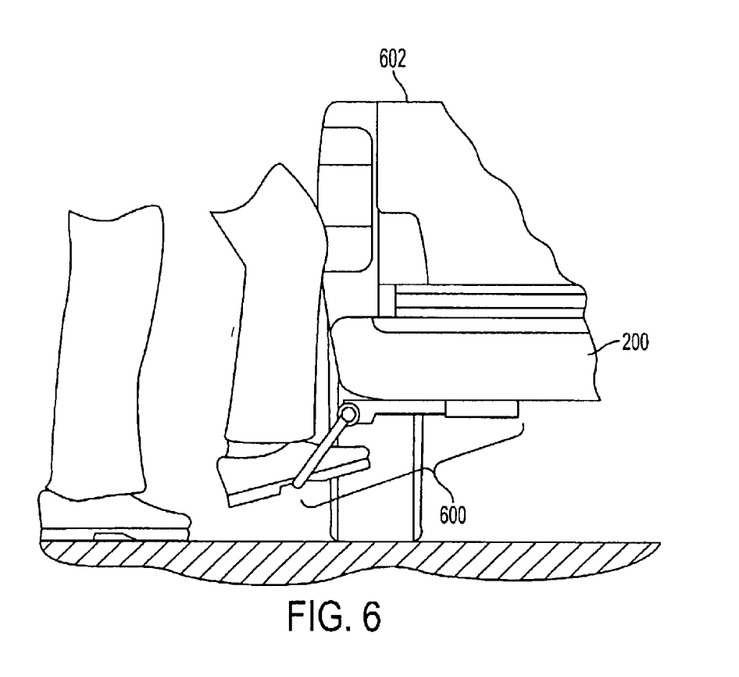
FIG. 6 shows a person using a step assembly in a deployed state mounted on a vehicle bumper according to an embodiment of the present invention.
Figure 7:
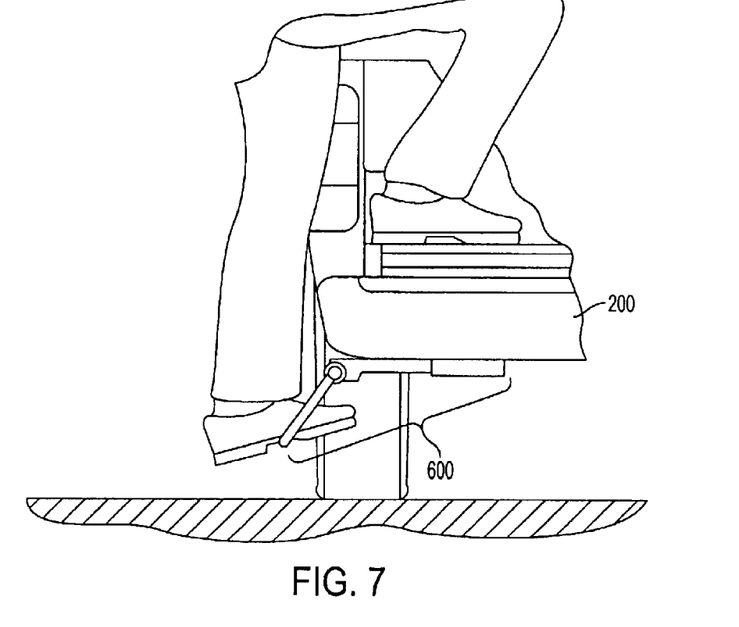
FIG. 7 shows a person stepping into a vehicle using a step assembly mounted on a vehicle bumper according to an embodiment of the present invention.

In a third embodiment as shown in FIGS. 6 and 7, step assembly 600 may be mounted on a vehicle bumper 200 on the side of a vehicle 602 to facilitate access to the bed from the side (either driver and/or passenger side).

Figure 8A:
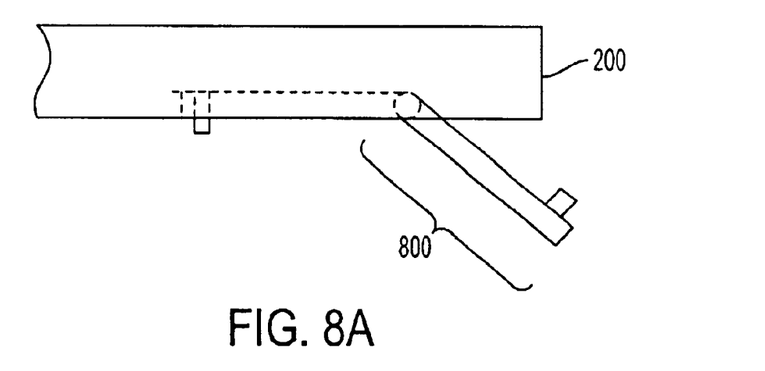
FIG. 8A shows a step assembly in a deployed position mounted in a position wherein much or all of the step supporting structure is hidden from view according to an embodiment of the present invention.
Figure 8B:
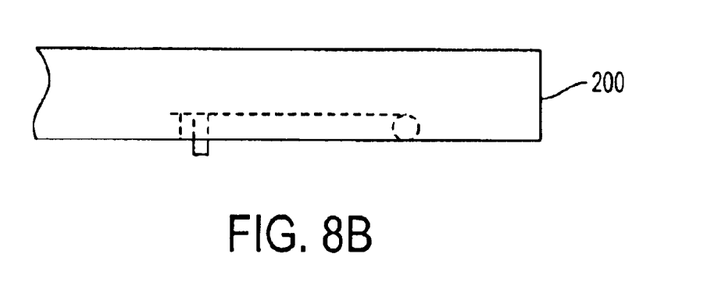
FIG. 8B shows a step assembly in a stored position mounted in a position wherein all or substantially all of the step is hidden from view according to an embodiment of the present invention.

In a fourth embodiment as shown in FIGS. 8A and 8B, the step assembly may be mounted on a vehicle bumper 200 such that it is substantially hidden from view (e.g., hidden from the view of a person standing in close proximity to the vehicle) when the step frame is in a stored position. FIG. 8A shows the step assembly 800 in a deployed position. FIG. 8B shows the step assembly substantially hidden from view in a stored position. By substantially hiding the step assembly from view, the step assembly may be more aesthetically pleasing than a comparable step assembly mounted within view. Further, the step assembly may be mounted in a recessed area, thereby not reducing the available ground clearance at a mounting location which may be a concern for off-road vehicles including 4×4 trucks. It should be appreciated that the available ground clearance can be defined by the departure angle $\theta_D$ as shown in FIG. 3, which generally refers the smallest angle, in a plane side view of a vehicle, formed by the level surface on which the vehicle is standing and a line tangent to the rear tire static loading radius arc and touching the underside of the vehicle rearward of the rear tire.

Thus, a bumper step assembly has been described according to the present invention. Many modifications and variations may be made to the techniques and structures described and illustrated herein without departing from the spirit and scope of the invention. Accordingly, it should be understood that the methods and apparatus described herein are illustrative only and are not limiting upon the scope of the invention.

What is claimed is:

1. A step assembly comprising:
   a step frame mounted for movement relative to a mounting surface between a deployed position and a stored position comprising:
      at least two legs oriented parallel to each other, and horizontally spaced from one another, each of said legs defining an upper end and a lower end;
      an axle connected at said upper end of said at least two legs; and
      a step member connected between said at least two legs proximate to the lower ends thereof; and
   at least one boss, wherein said at least one boss comprises at least one of the following two notches: a first notch that is configured for releasably holding said step frame in said deployed position and a second notch that is configured for releasably holding said step frame in said stored position,
   wherein said at least one boss comprises no more than two notches configured for holding said step frame, and
   wherein said step frame is configured for releasing from at least one of said notches along an axis of said axle by an axial force.

2. The step assembly of claim 1, further comprising: a first spring operating on the step frame, wherein said first spring applies a force for moving said step frame from the deployed position to the stored position.

3. The step assembly of claim 2, wherein the first spring automatically retracts the step frame from the deployed position to the stored position when the step frame is released from the first notch.

4. The step assembly of claim 2, further comprising: a second spring operating on the step frame, wherein said second spring applies a force for holding said step frame in the first notch in a deployed position.

5. The step assembly of claim 1, further comprising: a mounting bracket for mounting the step assembly to a surface, wherein the axle and the at least one boss engage said mounting bracket.

6. The step assembly of claim 5, wherein the mounting bracket is mounted such that said step frame may be rotated from a first position to a second position.

7. The step assembly of claim 1, wherein at least one of the step member and at least one of the at least two legs comprises: an operating tab for moving the step frame between the stored position and the deployed position.

8. The step assembly of claim 1, wherein the step assembly is configured to mount to a vehicle bumper.

9. The step assembly of claim 8, wherein the step assembly is configured to mount such that the step assembly is substantially hidden from view when the step frame is in a stored position.

10. The step assembly of claim 1, wherein the step assembly is configured to mount on at least one of the passenger side of a vehicle and the driver side of the vehicle such that a bed space may be accessed from at least one of the passenger side of the vehicle and the driver side of the vehicle.

11. The step assembly of claim 1, wherein the step assembly is configured to mount such that the step assembly lies substantially within a bumper when in the stored position.

12. The step assembly of claim 1, wherein at least one of said at most two notches is configured to engage at least one of said legs.

13. The step assembly of claim 1, wherein at least one of said at most two notches has a width and is configured to engage at least one of said legs having an approximately round cross section and having a diameter not greater than said width.

14. The step assembly of claim 1, further comprising: a first spring operating on the step frame, wherein said first spring applies a force for moving said step frame from the stored position to the deployed position.

15. The step assembly of claim 14, wherein said first spring applies said force for moving said step frame from the stored position to the deployed position by spring rotation, and wherein said first spring applies a force for holding said step frame in the first notch in the deployed position by spring compression.

16. The step assembly of claim 1, further comprising a spring operating on the step frame, wherein said spring applies a force for holding said step frame in the first notch in the deployed position by spring compression, and wherein said spring applies a force for moving said step frame from the deployed position to the stored position by spring rotation.

17. A step assembly comprising:
   a frame mounted for movement relative to a mounting surface between a deployed position and a stored position comprising:
      a leg having an upper end and a lower end; and
      an axle connected at said upper end of said leg;
   at least one of the following two notches: a first notch that is configured for releasably holding said frame in said deployed position and a second notch that is configured for releasably holding said frame in said stored position; and
   a spring for holding said frame in said at least one notch,
   wherein said step assembly comprises no more than two notches configured for holding said frame, and
   wherein said frame is configured for releasing from at least one of said notches along an axis of said axle by an axial force.

18. The step assembly of claim 17, wherein the frame has one of a substantially "L" shape, a substantially "U" shape, a substantially "Δ" shape, a substantially "∇" shape, and a substantially trapezoidal shape.

19. The step assembly of claim 17, wherein the frame is configured to mount to a bumper of a vehicle.

20. The step assembly of claim 19, wherein the frame is configured to mount to a bumper of a vehicle such that the step assembly is substantially hidden from view when the frame is in the stored position.

* * * * *